March 9, 1965

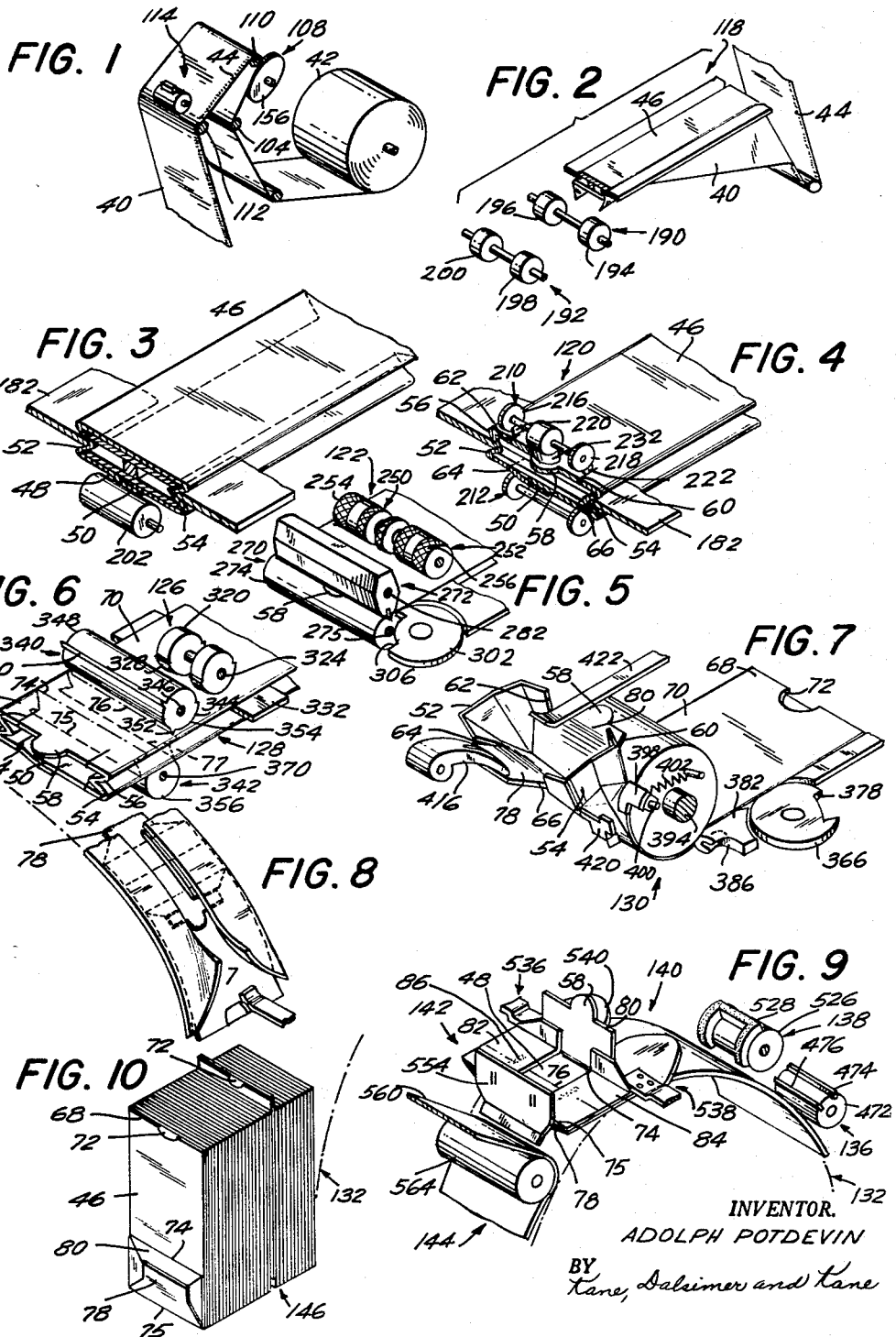

A. POTDEVIN 3,172,342

BAG-MAKING MACHINES

Filed Jan. 31, 1963

INVENTOR.
ADOLPH POTDEVIN
BY
Kane, Dalsimer and Kane
ATTORNEYS

INVENTOR.
ADOLPH POTDEVIN
BY
Kane, Dalsimer and Kane
ATTORNEYS

March 9, 1965    A. POTDEVIN    3,172,342
BAG-MAKING MACHINES
Filed Jan. 31, 1963    10 Sheets-Sheet 4
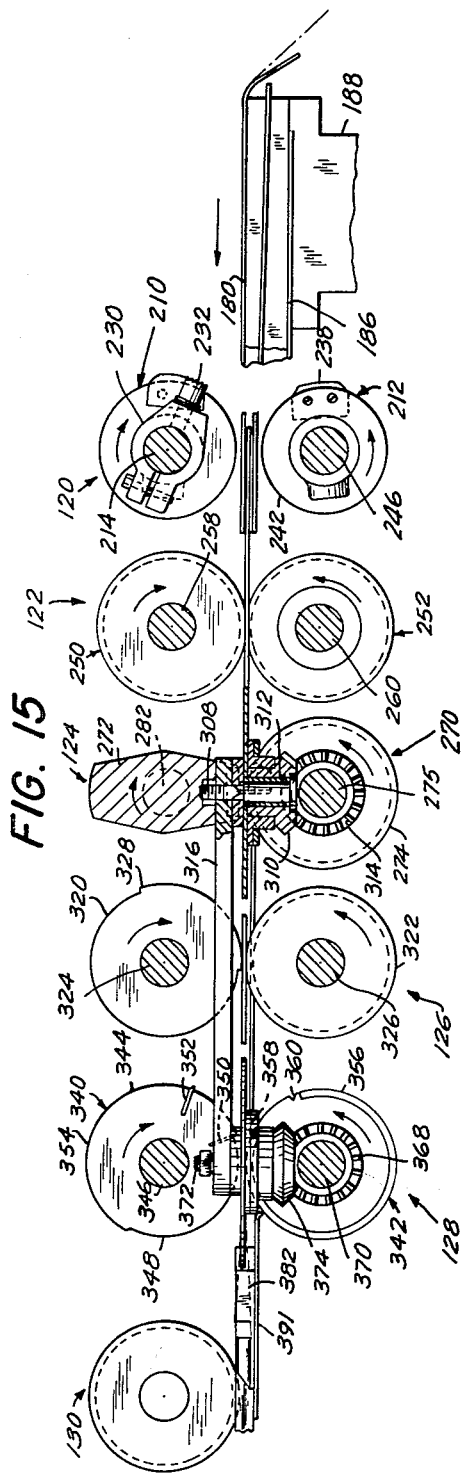
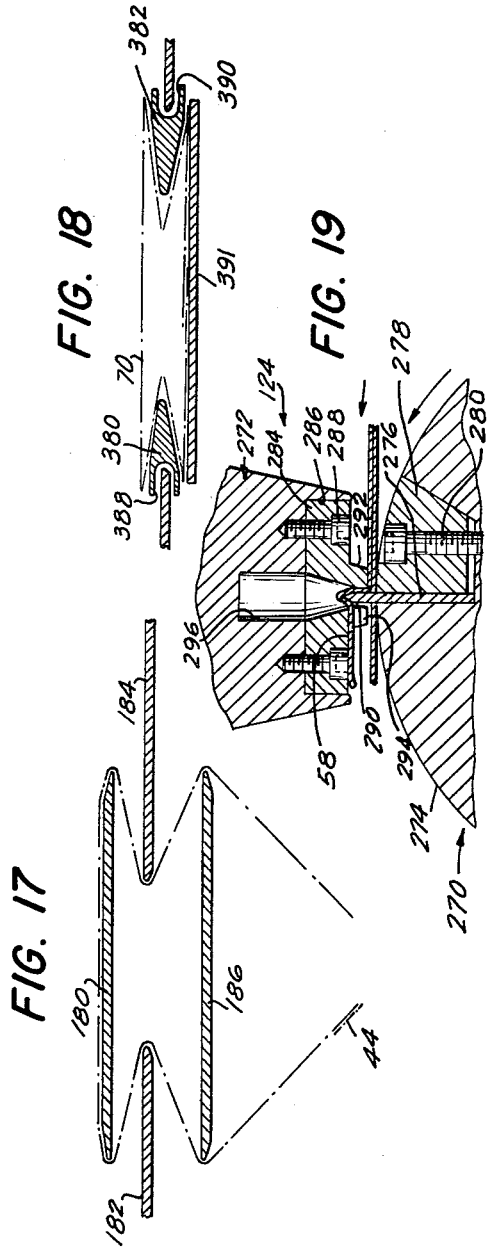
INVENTOR.
ADOLPH POTDEVIN
BY
Kane, Dalsimer and Kane
ATTORNEYS

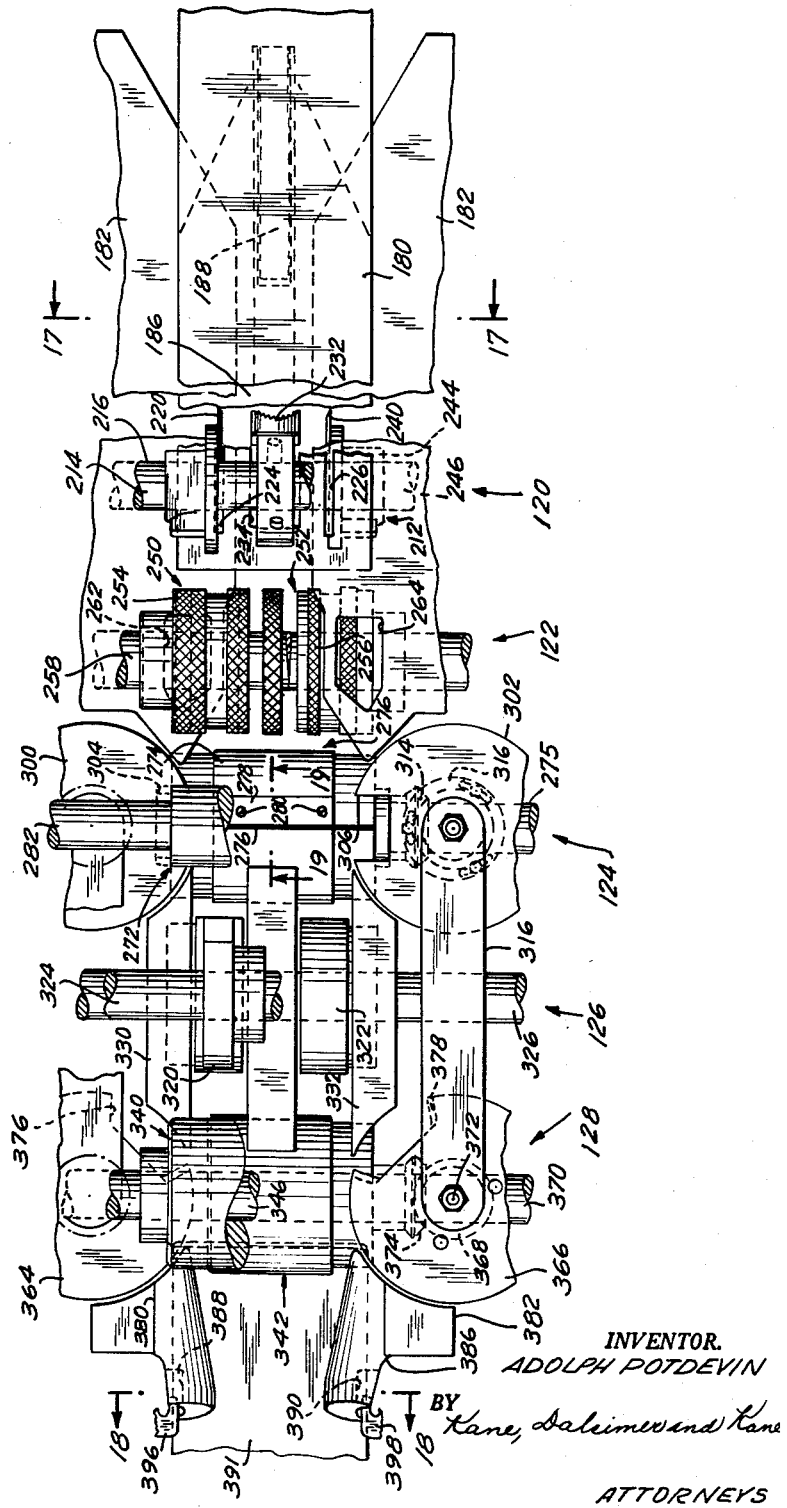

March 9, 1965 A. POTDEVIN 3,172,342
BAG-MAKING MACHINES
Filed Jan. 31, 1963 10 Sheets-Sheet 6

INVENTOR.
ADOLPH POTDEVIN
BY Kane, Dalsimer and Kane
ATTORNEYS

March 9, 1965

A. POTDEVIN 3,172,342

BAG-MAKING MACHINES

Filed Jan. 31, 1963

INVENTOR.
ADOLPH POTDEVIN

BY Kane, Dalsimer and Kane

ATTORNEYS

INVENTOR.
ADOLPH POTDEVIN

BY Kane, Dalsimer and Kane

ATTORNEYS

INVENTOR.
ADOLPH POTDEVIN

ATTORNEYS ions

United States Patent Office 3,172,342
Patented Mar. 9, 1965

3,172,342
BAG-MAKING MACHINES
Adolph Potdevin, Westwood, N.J., assignor to Potdevin Machine Company, Nyack, N.Y., a corporation of New York
Filed Jan. 31, 1963, Ser. No. 255,238
16 Claims. (Cl. 93—14)

This invention relates to bag-making machines, and more particularly, to an improved automatic machine of the type disclosed in my U.S. Patent No. 1,176.163 granted on March 21, 1916, for transforming a web of sheet material into a finished bag.

The bag manufacturing industry today is familiar with a number of bag-making machines and should be well aware of the fact that, at best, the preferred designs would produce approximately 500 bags per minute, with 400 bags per minute considered a significant output. With this in mind, it is a principal object of this invention to provide an improved design for bag-making machines whereby 600 to 700 bags per minute are capable of being produced with the average yield being the mean; namely, 650 bags per minute. It also being understood that with design sophistication in certain areas, it is possible to further increase the efficiency as well as output of the machine, fabricated in accordance with the present invention.

While I shall disclose a single preferred embodiment of my invention of a machine for producing self-opening bags having the so-called square satchel-bottoms, it is to be understood that other objects and advantages incident to the various features of the invention may be employed in connection with other machines, especially those which form other well known forms of bags. Thus, other objects and advantages will become apparent from the following detailed description of my invention, which is to be taken in conjunction with the accompanying drawings, in which:

FIGS. 1 through 10 illustrate schematically the sequence of steps followed in transforming a web of sheet material into a finished bag;

FIG. 15 is a schematic view of those stations of the machine which transform the web of sheet material into a bag blank having the desired shape configuration and characteristics;

FIG. 16 is a top plan view of the arrangement illustrated in FIG. 15 which also serves to maintain tuck separation;

FIG. 17 is a sectional view taken along the line 17—17 of FIG. 16;

FIG. 18 is a sectional view taken along the line 18—18 of FIG. 16;

FIG. 19 is a fragmentary sectional view of the cut-off station taken along the line 19—19 of FIG. 16;

Figure 11:
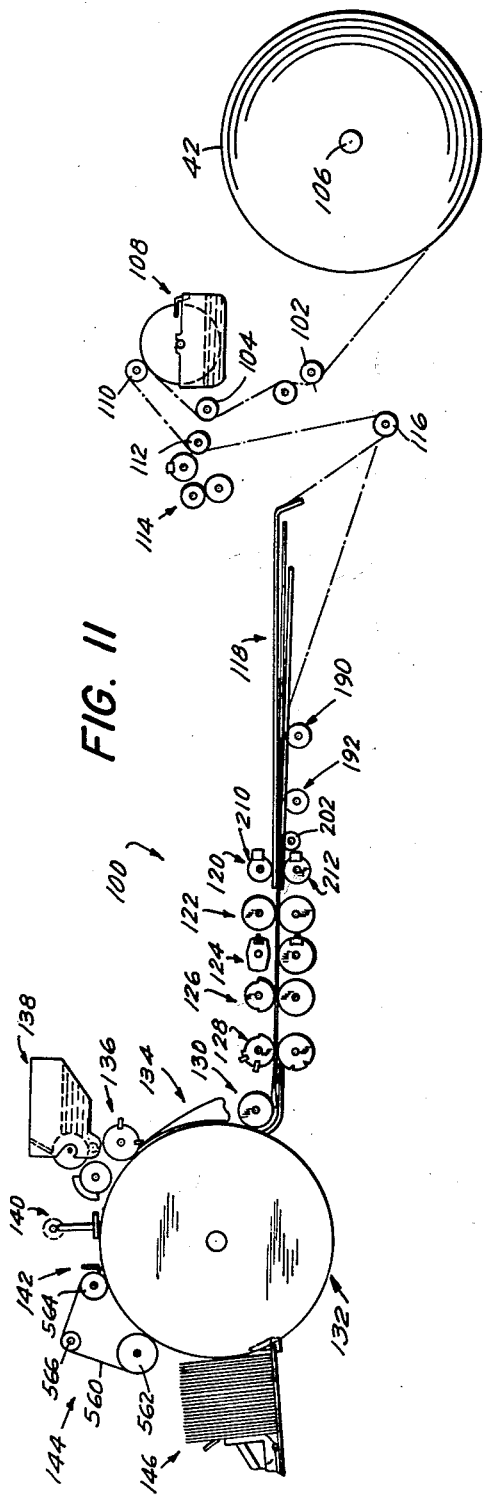
FIG. 11 is a schematic view illustrating the over-all layout of the stages, as well as stations, with accompanying structure, included in the bag making machine fabricated in accordance with the present invention.

As will be evident, the bag-making machine, constructed in accordance with my invention, progressively transforms a web of sheet material, as for example, paper into tubing, which as rapidly as it is produced, is converted into bags of predetermined length. According to my invention, the paper web is suitably fed through and exposed to pasting and forming stations by means of which is progressively converted into a bellows sided tube, at prescribed intervals, the tube is periodically notched, slit and then served in a predetermined fashion for conversion into tubular bag blanks preparatory to bottom-forming operations upon the forward slitted portions of the successive blanks.

Thus, in the bag formation process, as illustrated in FIGS. 1 through 9, the web 40 of a roll of sheet material 42, which for purposes of the present description will be taken to be paper, is provided with a longitudinally extending seam 44 of adhesive material. It is then formed into a tube having a top layer 46 and a bottom layer 48 with the overlapping ends of the web 40 being secured together by the adhesive 44 in forming the lingitudinally extending seam 50. Additionally, a pair of opposed bellow folded sides 52 and 54 are conveniently produced and strategically located along the longitidinally extending peripheral side edges of the tube.

As stated in the foregoing, the tube is periodically notched, slit and then served, converting it into bag blanks of predetermined length. After such an operation, the tube of the present invention will have its leading end 56 formed with a projecting tongue on tab 58 extending from the upper layer 46. The leading end 56 is also provided with a pair of parallel slits 60 and 62 in the upper layer 46 on each side of the tab 58. Similarly, the bottom layer 48 is formed with a pair of corresponding aligned and parallel slits 64 and 66.

Since the tube is severed transversely from a location proximal the base of the tab 58 of the top layer 46, the trailing end 68 of the thusly formed bag blank 70 will include the notch 72 corresponding in size with the tab 58. This notch 72 will be located on top of the ultimately finished bag such that when a number of bags are stacked side by side, gripping of a bag by mere thumb pressure is facilitated. Most important of all, by so grasping the bag, the self-opening feature will become evident.

The tubular bag blank 70 is now formed with a pair of upper parallel score lines 74 and 76 adjacent the leading end 56, but spaced therefrom substantially as illustrated. These score lines extend into a pair of companion score lines 75 and 77 in the bottom layer 48. At this time, the leading end 56 of the blank 70 is subjected to a tuck spreading operation during which the leading end is fully distended. While in this fully distended position, the leading end 56 is flattened such that the upper layer 46 is folded back on itself along the score line 76 to thereby provide a leading flap 78 of bottom layer 48 from the score line 74. Thus, the upper layer 46 and bottom layer 48 will cooperate and combine with sides 52 and 54 to form the overlying panels 82 and 84 disposed between score lines 74 and 75.

Shortly thereafter, adhesive or paste 86 is advantageously applied to the surfaces of the flap 78 and panel portions 82 and 84, substantially as illustrated. The trailing flap 80 is then folded along the score line 74 forwardly and upon the panel portions 82 and 84, and consequently, part of the exposed adhesive 86. Subsequently, the leading flap 78 is folded rearwardly along its fold or score line 75 so that it will not only adhere to the panels 82 and 84, but rather to the outer surfaces of the trailing flap 80. The bag blank 70 is thus formed into a finished bag, which may be conviently stacked among others, in accordance with a predetermined arrangement whereby their number can be ascertained. In FIG. 10, the finished bags are so stacked with a bag intermittently elevated to indicate a predetermined count.

The previously described bag is manufactured by a bag-making machine fabricated in accordance with the present invention. The over-all layout of this machine is schematically illustrated in FIG. 11 for purposes of denoting the various stations, the cooperative operation of which automatically transforms a web of sheet material into the finished product. Thus, the bag-making machine 100 of the present invention may include guide rolls 102 and 104 for the web 40 of the roll of sheet material 42, which as stated in the foregoing, will be taken to be conventionally employed paper for such purposes. This roll of paper 42 is then conveniently mounted on a spindle 106 for rotation. The web 40 is then passed over the wheel applicator of a seam paste pot assembly 108, to be described in detail shortly, for purposes of applying adhesive 44 along one of the marginal edges of the web. Immediately thereafter, the web is passed over roll 110 and eventually roll 112, at which location the web 40 is suitably marked with indicia, or for that matter, embossed in accord with conventional techniques at preset intervals with the manufacturer's brand name and bag size. In this connection, a suitable marking assembly 114, which is operable in timed sequence with the movement of the web 40 is employed for such purposes; and, since such mechanism is well known to the art, it will not be described or disclosed in detail herein. Suffice it to say that this marking mechanism is timed in such a manner with the web feed that it applies the indicia at a location which will eventually be at, or adjacent to, the top of the finished bag. The web 40 is then passed over roll 116 and further passed through the forming station 118 where it is formed into the tube, illustrated in FIG. 3, through the cooperation of forming plates and pressures rollers, which will be described in detail shortly. The next station to which the web, now in tubular form is subjected, includes the slit and thumb notch assembly 120 at which the projection 58 and complementary notch 72 are formed together with the slits 60 and 62 in top layer 46 and slits 64 and 66 in bottom layer 48. The web 40 is fed continuously by the web feed mechanism 122 through the cut-off station 124 at which the web tube is cut into predetermined lengths determined by the location of the base of the tongues 58, which as was mentioned in the above is preset.

The tubular bag blanks 70 of FIG. 5 are thus formed and passed to the next station by means of forwarding mechanism 126. In this connection, the blanks 70 are exposed to scoring station 128 at which a pair of transverse score lines 74 and 76 are formed in the top layer 46 whereas score lines 75 and 77 are formed in the bottom layer 48 as previously described. The tubuar blank 70 thus formed, is subjected to the bottom opening and tuck spreader station 130 at which the leading end 52 of the blank 70 is distended to its fullest extent. At such time, the travel of the blank 70 on the bag bottom forming drum 122 is initiated; and it is there subjected to a number of stations on the drum periphery at which certain steps are performed in finishing the bag blank 70.

Accordingly the blank 70 is processed to the configuration shown in FIG. 8 by the forming station 134, after which the flattened blank is tacked to the circumferentially extending periphery of the drum 132 by the tucking mechanism 136 along the fold or score lines 74 and 75. The bottom paste pot and sector assembly 138 applies adhesive in accordance with a predetermined pattern to the inner faces of the leading flap 78 and panels 82 and 84 in a manner similar to that illustrated in FIG. 9.

The trailing flap 80 is then folded forwardly along its score line 74 at the trailing flap folding station 140. Substantially simultaneously therewith, the leading flap 78 is folded rearwardly along its score line 75 by the leading flap folding mechanism 142. The pressure applying assembly 144 serves to secure the leading and trailing flaps in forming the bag bottom through the interposed adhesive 86. The finished bags are then accumulated in a prearranged manner at the stacking station 146 so that the number of finished bags can be easily counted and ascertained, and be readily available in present quantities for shipping and storage or packing.

Reference is now made to the seam paste pot assembly 108 which serves to properly apply the adhesive 44 to the marginal edge of the web 40 substantially as illustrated in FIG. 1 for purposes of ultimately forming the seam 50. This pot assembly includes a pot or receptacle 150 for containing the selected adhesive or paste adapted for effectively forming the seam 50. The pot 150 may be substantially rectangular in configuration and at its upper periphery includes a pair of opposed journals 152 for rotatably receiving the shaft 154 for the wheel applicator 156 fixedly secured to the shaft in any known manner. The shaft 154 is suitably driven in its journals 152 and is synchronized with the web feed. The rotation of the wheel applicator 156 in the paste results in a pumping action which is doctored by the shield 158 which in turn limits the amount of paste pumped and provides isolated return flow. Obviously, at high speeds, the wheel applicator 156 will tend to splatter and splash the contained paste in pot 150; and accordingly, a slotted guard or shield 158 may surround the wheel 156 with adequate clearance. As shown, the guard 158 may be pivotally mounted on a bracket 160 which, in turn, is clamped to the pot 150 or fixed thereto in any other suitable manner.

Since the present invention contemplates relatively high web travel speeds, it naturally follows that the rotation of the wheel 156 will be correspondingly rapid. Under such circumstances, it has been found that a wheel 156 traveling at high speeds will create a cavity in the contained paste. Consequently, this phenomenon hinders the proper accumulation and contact of the contained adhesive onto the circumferentially extending periphery of the wheel which eventually comes into contact with the desired sectors of the web 40 for purposes of applying the adhesive 44 along the desired zone. With this in mind, I preferably employ means for assuring contact of the contained paste with the periphery of the wheel 156 by reducing the tendency for a cavity to form in the paste due to the increased rotation of the wheel. I thus employ a pair of plates 162 and 164, both of which have transversely extending flanges 166 and 168 respectively, directed away from one another, substantially as illustrated. The plates 162 and 164 are spaced from one another with their respective flanges 166 and 168 suitably secured directly to the base of the pot 150. The plates 162 and 164, although spaced from one another, converge at their respective ends 170 and 172 such that the surfaces of these plates at such ends are substantially parallel to the wheel 156 at a location in the pot 150 at which the wheel emerges from the contained paste upon rotation. The other ends 174 and 176 of plates 162 and 164 respectively, are diverging with respect to one another, which divergence may be somewhat arcuate in configuration, substantially as shown. Thus, with adhesive or paste contained in pot 150 and wheel 156 traveling at relatively high speeds the plates or guides 162 and 164 will channel the adhesive therebetween and tend to eliminate the creation of a cavity due to the rapid movement of the wheel 156. Accordingly, it can be assured that the periphery of the wheel 156 will pick up sufficient paste at substantially all times, notwithstanding its rapid rotation so that the adhesive on the periphery will be transferred in adequate amounts to the marginal edge of the web 40 so that the adhesively secured seam 50 is properly formed.

Attention is now directed to the forming station 118 at which the web 40 with is applied adhesive 44 is transformed into a substantially tubular web resembling that configuration illustrated in FIG. 3. It will be observed that an upper plate 108, intermediate plates 182 and 184 and bottom plate 186 are conveniently located and spaced from one another for purposes of providing the desired configuration in the sheet material 40. The top and bottom portions of these forming plates may be advantageously mounted by the stand 188, whereas the intermediate plates 182 and 184 may project inwardly from the chassis employed for the bag-making machine 100. It will become evident that the top and bottom plates 180 and 186 terminate beyond the slit and thumb notch assembly 120 and short of the feed 122, while on the other hand, the intermediate plates 182 and 184 terminate immediately beyond the feed mechanism 122. In this connection, it should be understood that the terminal end of the intermediate plates 182 and 184 cooperate with other suitably located elements along the path of travel of the web 40 and subsequently formed bag blank 70 in maintaining proper tuck separation prior to the time that the bottom opening cylinder and tuck spreader assembly 130 are encountered.

The transformed web 40 is now passed over sets of draw rollers 190 and 192, which serve to fold under the marginal side edges of the web as well. In order to accomplish this, each set of draw rollers 190 and 192 may be made up of a pair of rotatable roller parts. Thus, in the case of draw roller 190, the individual roller parts may be 194 and 196, whereas roller parts 198 and 200 may be included in the other draw roll assembly.

Shortly thereafter, the marginal side edges of the web 40, which are now in an overlapping relationship, are passed over a seam pressure roller 202 which facilitates the securement of the overlapping marginal side edges of the web 40 through the interposed seam of adhesive 44.

Referring now to the slit and thumb notch assembly 120, it should be clear that a pair of roller assemblies 210 and 212 cooperate with one another in forming respectively, slits 60 and 62 on the one hand, and slits 64 and 66 on the other hand, whereas the upper roller assembly 210 is advantageously provided with means for establishing tongue 58 and consequently the notch 72 at this station 120. The upper roll assembly 210 includes a rotatably driven shaft on which is fixedly mounted a pair of spaced, as well as adjustable collars 216 and 218 securing the knifeblades 220 and 222 respectively. Corresponding slits 224 and 226 of proper size cooperate with the respective blades 220 and 222 to provide the desired cutting action and are conveniently located in the upper forming plate 180. Thus, it should be evident, that with each revolution of the shaft 214, slits 60 and 62 are provided in the web 40 by the cutting blades 220 and 222 respectively. The shaft 214 additionally supports another collar 230 which includes the projecting knife 232 serving to form the necessary puncture for providing the tongue 58. Once again the upper forming plate 180 is provided with a suitable cut-out or opening 234 which permits the blade 232 to project therethrough during the thumb notching operation.

The slots 64 and 66 formed in the bottom layer 48 are cut by the bottom roll assembly 212, and more specifically by the blades 238 and 240. These blades similarly project from collars 242 and 244 respectively, both of which are conveniently affixed to the rotatably driven bottom shaft 246 whose revolution is obviously synchronized with that of upper shaft 214. As was the case with the upper roll assembly 210 and the upper forming place 180, the blades 238 and 240 of the bottom roll assembly 212 are permitted to project through suitably formed openings in the bottom forming plate 186 in order to provide the proper cutting action in forming the lower slits 64 and 66 in the bottom layer 48 of the web 40.

The feed station 122 serves to drive the web 40 and is comprised essentially of an upper and lower roll assembly 250 and 252. In this connection, the upper roll assembly 250 will include a number of knurled roller segments 254 which cooperate with mating roller segments 256 of the bottom roll assembly 252 for pinching or engaging therebetween the web 40, and consequently driving it therebetween as a result of the synchronized rotational movement of these assemblies. This rotation is transmitted to the knurled roller segments 254 and 256 respectively, by rotatably driven shafts 258 and 260. In order to facilitate the pinching or gripping of web 40, the knurled roller segments 254 and 256 are aligned either through the space provided between the side forming plates 182 and 184 or, for example, suitably formed openings 262 and 264 substantially as illustrated.

The web 40 is accordingly driven through the cut-off station 124, during which it is cut into the tubular bag blanks 70, previously described. In this connection, the cut-off station 124 includes a lower knife supporting roll assembly 270 and an upper mating roll assembly 272 which serves to advantageously present a shearing edge in a manner to be described shortly.

Referring initially to the roll assembly 270, it will be noted that it comprises essentially a relatively large drum 274 secured to the rotatable shaft 276. The drum 270 is suitably recessed longitudinally along its periphery for purposes of receiving the knife blade 276 therein, as shown. This blade 276 is of sufficient length to sever the tubular web 40 into the bag blanks 70, and is secured in place by a wedge 278, disposed in the recessed periphery of the drum 274 by means of a number of bolts 280 suitably projecting through the wedge 278 into tapped bores in the drum proper. As illustrated, the exposed face of the wedge 278 may possess a radius of curvature substantially equal to that of the circumference of the drum 270, so that continuity will be maintained; and consequently the feed of the web 40 through the cut-off station 124 will not be disturbed.

The upper roll assembly 272 is suitably journaled for rotation by means of the shaft extensions 282 at both of its ends. A plate 284 extends longitudinally in a suitably dimensioned recess 286 in a periphery of the upper roll and is suitably secured therein by a series of bolts 288 projecting through the plate 284 into suitably tapped bores in the upper roll. The exposed face of plate 288 includes a cavity 290, defined by a pair of longitudinally extending protuberances 292 and 294, the latter of which is interrupted for purposes of accommodating the tongue 58 of the web 40, so that it is not severed during the cut-off operation. As will be appreciated, the cavity 290 conveniently receives the blade 276 which cooperates with the inner faces of the protuberances 292 and 294 to obtain the desired shearing action and severing of a tubular bag blank 70 from the web 40. As mentioned in the foregoing, the protuberance 294 is interrupted for purposes of accommodating the tongue 58, which additionally is capable of free movement in the cavity extension 296 in both the plate 284 and surfaces of the upper roll proper. Thus, provisions are provided for assuring that the tongue 58 and the accompanying thumb notch 72 is left intact after the severed tubular blank 70 leaves the cut-off station 124.

In order to effectively form the bag bottom, it is preferred that the tuck or bellows sides 52 and 54 remain partially unfolded or expanded, in order that the proper functioning of the bag bottom opening cylinder assembly 130 is assured. However, difficulty may arise in accomplishing this desired end during the operation of the cut-off station 124. To avoid any complications at such time, the present invention contemplates mechanism for assuring tuck separation by providing means which serve, in effect, as extensions of the side forming plates 182 and 184. These extensions assume the form of rotatable disks 300 and 302, which are constantly rotated at the same speed in synchronization with the rotation of the roll assemblies 270 and 272 of the cut-off station 124. Under such circumstances, apertures 304 and 306 in the periphery of the respective disks 300 and 302 will be in alignment with the mating elements of the upper and lower roll assemblies 270 and 272, and consequently permit their projection therethrough according the desired cutting action at the proper time accomplished while still maintaining an effective tuck separation immediately thereafter as well as prior thereto. Both disks 300 and 302 may be suitably mounted on a stud 308, which in turn supports a miter gear 310. This miter gear 310 is rotatable on the shaft 308 through an interposed bearing 312 and conveniently meshes with a suitably supported mating pinion gear 314, one of which is mounted for rotation on each end of the shaft 276. As will be appreciated, the shafts 308 are adjustably suspended from a plate 316 adequately supported by the chassis of the bag-making machine 100.

The forwarding station 126 is so constructed and arranged as to operate periodically in actuating a bag blank 70 after it is produced by the cut-off station 124. Furthermore, the operation of the forwarding station 126 serves to accelerate somewhat, the longitudinal movement of the recently formed bag blank 70 for purposes of increasing the space between the blanks, which should only be of a magnitude sufficient to permit the subsequently encountered stations during the formation process, to perform their intended functions. Under such circumstances, the forwarding station 126 will include a pair of mating rolls 320 and 322, which are constantly driven in synchronization with one another by their respective mounting shafts 324 and 326. The upper roll 320 has an interrupted face such that only a limited projecting sector 328 is adapted to cooperate with the roller 322 in providing the bite capable of engaging the blank 70 and forwarding it to the scoring station 128.

The tuck or bellow folds 52 and 54 are maintained in a partially unfolded or open position during the passage of the blank 70 through the forwarding station 126 by means of a pair of spaced plates 330 and 332, both of which may be suitably supported by the chassis of the bag-making machine 100.

The bag blank 70 now passes through the scoring station 128 at which the transverse score lines 74 and 76 are impressed in the upper layer 46 and lines 75 and 77 formed in the bottom layer 48 thereof. For this purpose, an upper roll assembly 340 and bottom roll assembly 342 cooperate and also serve to feed the blank 70 to the next station in accordance with the predetermined sequence. The upper roll assembly 340 includes a drum 344 fixedly mounted on a suitably journaled shaft 346. The circumferentially extending periphery of the drum 344 is in the nature of a stepped surface with the longitudinally extending sector 348 of minimum radius of curvature mounting one of the pair of scoring blades 350 and 352, as shown, for producing the aforementioned score lines. The longitudinally extending sector 354 having the largest radius, cooperates with the bottom roll assembly 342 in producing the necessary bite for feeding the scored blank 70 into the next formation station 130.

Under those circumstances, the bottom roll assembly 342 includes the drum 356 having a pair of longitudinally extending slots 358 and 360 in its periphery for mating with the respective scoring blades 350 and 352 in producing the desired score line.

Since the assurance of tuck separation of the bag blank 70 is an important consideration of the present invention as it approaches the bottom opening cylinder station 130, another pair of revolving disks 364 and 366 are located at the trailing end of plates 330 and 332 in substantial alignment therewith. These disks 364 and 366, as was the case with disks 300 and 302, take their drive off a mating miter gear 368 on the shaft 370 of the associated bottom roll assembly. In this connection, an adjustable stud 372 is suspended from plate 316 and supports a miter gear 374 through the cooperation of an interposed bearing. Each of the disks 364 and 366 are rotatable with the accompanying pinion gear 374, and in addition, include the cut-out peripheral segments 376 and 378 respectively. The rotation of the revolving disks 364 and 366 are in synchronization with that of both the drums 344 and 356. Accordingly, the scoring blades 350 and 352, as well as the longitudinal slots 358 and 360 are so disposed with respect to the cut-out peripheral segments 376 and 378 such that all will be in substantial alignment when the scoring operation is to take place on the tubular bag blank 70.

Reference is now made to the bottom opening cylinder assembly 130. It will thus become evident that the leading end 56 of the bag blank 70, eventually transformed into the bag bottom, is fully distended along certain of the score lines so that it may be subsequently flattened by the bottom forming station 134. As the bag blank 70 approaches the bottom opening cylinder assembly 130, its tucked or bellows folded sides 52 and 54 are further expanded by passage over the opposed tuck separator plates 380 and 382 suitably supported by the chassis of the bag-making machine 100. These plates 380 and 382 are of somewhat greater thickness and serve to further increase the spread of the tucks so that subsequently encountered finger elements can readily grasp the selected portions of the leading end 56 of the bag blank 70 and fully distend the bottom opening. As will be appreciated, the thickness of the tuck spreader plates 380 and 382 progressively increase along their length. At the trailing end of these plates 380 and 382 the effective thickness is at a maximum and it is at this end that cut-out sections 384 and 386 appear respectively. These respective cut-out sections provide longitudinally extending slots 388 and 390, which permit entry of fingers therein for grasping the leading end 56 of the bag blank 70 along the score line 74.

In order to guide the bag blank 70 proper through the bottom opening cylinder, a guide plate 391 is disposed beneath the plates 380 and 382 and terminates in a somewhat curved end as shown, which falls short of the drum 132.

In this connection, the bag bottom opening station 130 includes the cylinder 392 which is mounted for rotation with shaft 394. The tucks 52 and 54 of the bag blank 70 are grasped along the score line 74, approximately as this part of the bag blank 70 passes the trailing end of the tuck separating plates 380 and 382 by a pair of cylinder mounted fingers 396 and 398 respectively. Fingers 396 and 398 are located on opposed sides of the cylinder 392 and are actuated in substantially identical fashion for purposes of appropriately gripping the bag blank 70 and releasing it in a predetermined timed sequence. For this reason, only one of the finger actuating means will be described in detail, bearing in mind that the other is similarly actuated.

Figure 22:
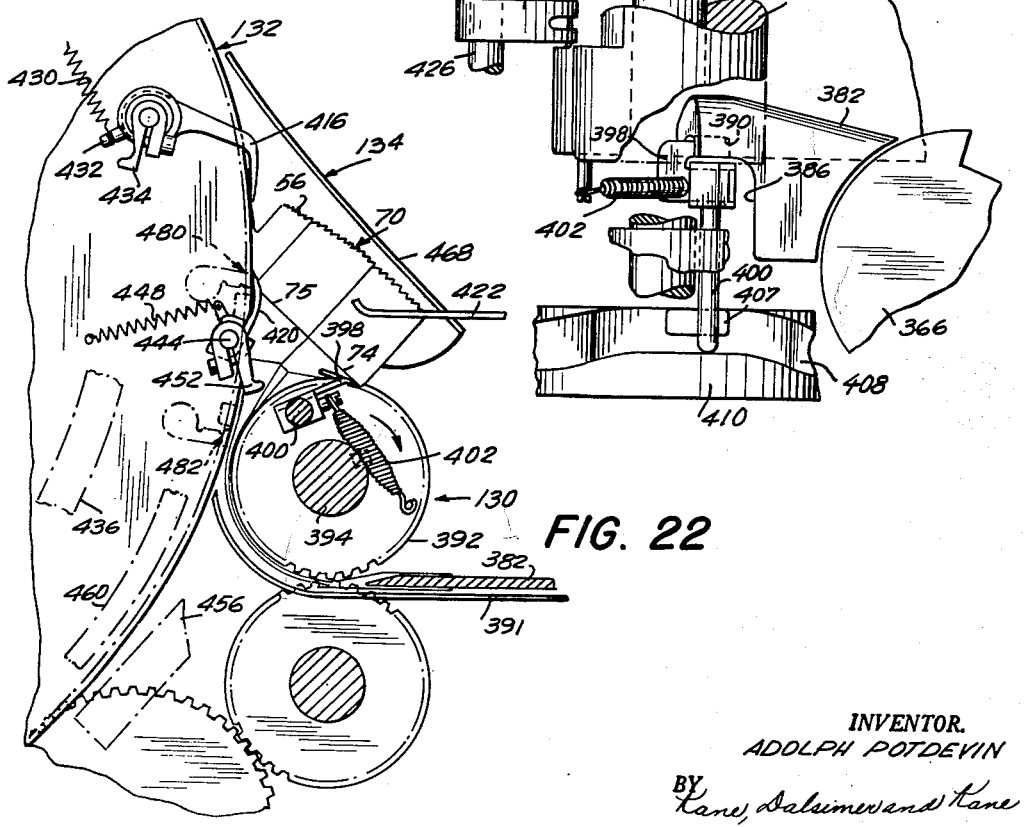
FIG. 22 is somewhat similar to FIG. 20 with the arrangements of parts being illustrated during the point at which the bag bottom is fully distended.
Figure 23:
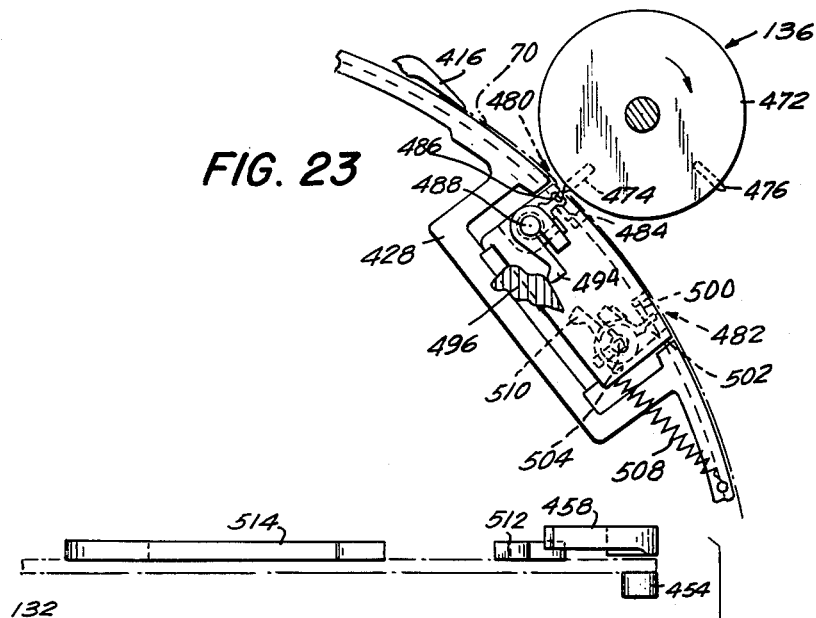
FIG. 23 is a fragmentary elevational view of the bag-tucking assembly.

Keeping this in mind, reference is now made to finger 398 and its actuating means. Thus a peg 400 has mounted at its inner end finger 398. This finger 398 is biased with respect to the drum 392 by means of spring 402 suitably anchored to both members substantially as illustrated. The other end of the peg 400 includes a cam follower 407 which rides in a track 408 which provides a camming function in that it induces the peg to rotatably oscillate and consequently grip and then release the tuck of the bag blank 70 along the score line 74 at the desired times. In this connection the peg 400 will oscillate and the spring 402 will thereby force the finger 398 radially inwardly and into pressure engagement with the outer periphery of the drum 392 to grasp the bag blank 70 at this location in a timed manner. The blank will be so gripped as the score line 74 is approximately opposed the exposed slots 388 and 390 of the respective tuck separating plates 380 and 382. The finger 398 will then release its grip as a result of the oscillation of peg 400 in its track 408 at approximately that location illustrated in FIG. 22 at which flattening of the eventual bag bottom, as schematically illustrated in FIG. 8, is assured at the forming station 134.

The peg 400 is additionally provided with a longitudinal oscillatory motion for purposes of enabling the finger 398 to be retracted sufficiently axially away from the drum 392 to clear the recessed segment 386, thereby enabling it to be shifted longitudinally toward the drum 392 into the recess or slot 390 and at the proper time, into eventual gripping engagement with the lead end 56 of the bag blank 70 along the scored line 74 at the tucked side 54. This longitudinal shifting of the peg 400 may be accomplished by means of a second cam 410 which is adapted to engage the approximately located end of the peg 400, substantially as illustrated.

In order to obtain the desired opening of the leading end 56 of the bag blank 70 in forming the bag bottom, the bottom layer 48 of the bag blank 70 should be secured at this station 130. In this connection, one of the bag blank handling stations on the drum 132 will include a drum center finger 416, which is cam operated, and as such, oscillatable such that it is in a raised position approximately at the time that the periphery of the leading end 56 of the bag blank 70 emerges from its guided relationship with respect to the terminal end of the guide 391. Thus, at this time, the finger 416 will be released to thereby grip or engage the inner face of the tab 78 of the bottom layer 48. As the drum 132 continues to rotate, the score line 75 will emerge from the terminal end of the guide 391, at which time the drum side fingers 418 and 420 are caused to operate, gripping the tucked sides 52 and 54 respectively, along the score line 75 after the score line passes the center line of drum 132 and cylinder 392. Under such circumstances, as the bag blank 70 is passed through the interstice provide between the cylinder 392 and the drum 132, the leading end 56 of the bag blank 70 will be substantially fully opened or distended along the associated score lines 74 and 75. Prior to this, a stationary plate 422 is received through the open end 56 into ultimate engagement with the inner face of the flap or tab 80. When the leading end is thus fully distended, its complete opening is assured by the drum center finger 416 and the plate 422. The gripping fingers 396, 398, 418 and 420 within the tuck sides of the bag blank, may release their grip because of the stationary forming station 134 which can now effectively flatten the leading end 56 of the bag blank such that the upper layer 54 is folded upon itself along the score line 76.

Referring now to the actuating means for the drum center finger 416, it will be noted that this finger is fixedly mounted on a shaft 426 suitably journaled in the frame 428 of the drum 132. A spring 430 extends between a pin 432 projecting radially from the shaft 426 and frame 428, to normally bias the finger 416 against the associated peripheral surfaces 102, and therefore create the desired pressure grip employed in grasping the tab 78. A cam follower 434 is also secured to the shaft 426 and is adapted to engage with stationary cam 436 during the rotation of drum 132 for purposes of raising the finger 416 and permit its gripping engagement with this tab at the desired moment.

As stated in the foregoing, the drum fingers 418 and 420 grip the bottom layer 48 of the tubular bag blank 70 along the score line 75 shortly after the score line emerges from the guide 391 between surfaces of the drum 132 and cylinder 392 and passes centerline of drum 132 and cylinder 392. These fingers 418 and 420 are respectively secured to suitably journaled pins 442 and 444. Both of these pins are displaceable axially towards one another against the bias of spring 446 and thereby enable the associated drum fingers 418 and 420 to be inserted into the opened tuck folds 52 and 54 respectively of the bag blank 70. A pair of springs 447 and 448 extend between the frame 428 and the corresponding fingers 418 and 420 to create the necessary bias for these fingers to assure a firm grip of the bag blank 70 along the score line 75. In order to raise these fingers 418 and 420, a pair of cam followers 450 and 452 on the respective pins 442 and 444, advantageously engaged with cams 454 and 456, respectively. This desired gripping is accomplished, as stated in the above, by shifting the pins 442 and 444, and consequently, the corresponding fingers 418 and 420 toward one another against the bias of the spring 446. These pins are shifted axially toward one another automatically upon their engagement with suitably disposed cams 458 and 460 respectively. Naturally, the amount of permissible displacement of the pins 442 and 444 is preset in an axial direction through the interengagement of surfaces of the followers 450 and 452, and adjacent surfaces of the drum frame 428 as shown.

It will become apparent shortly that immediately before the tucking operation at the tucker station 136, the mating engagement of the pins 442 and 444 with their corresponding cams 458 and 460 will end, and thereby permit the fingers 418 and 420 respectively to retract due to the influence of the spring 446. Similarly, the drum center finger 416 will be raised to thereby free the tab 78 about the time that the bottom flap folding station 140 is encountered by the bag blank 70. The elevation of this finger 416 will be accomplished upon the engagement of the cam follower 434 with the conveniently located stationary cam 462.

It will be recalled that the plate 422 is eventually disposed interiorly of the now opened leading end 56 of the bag blank 70 at such time as the drum center finger 416 engages the inner face of the tab 78, cylinder fingers 396 and 398 engage the respective tuck folds 52 and 54 along the score line 74, and the drum fingers 418 and 420 similarly grip the score line 75. As the bag blank 70 is thus fed forwardly along the drum 132, the cylinder fingers 396 and 398 will release their grip as previously described and the plate 422 will come in contact with the inner face of the flap 80 to thereby retain the open state of the leading end of the bag blank 70 as it is exposed to the bag bottom forming station 134. At such time, the leading end 56 of the bag blank 70 will be flattened such that the top layer 46 is folded upon itself along the score line 76 and the panel portions 82 and 84 formed. This is accomplished by means of a pair of shoes 466 and 468, the leading ends of which are somewhat arcuately divergent, as illustrated in order to facilitate the insertion and transmittal therethrough of the open and fully distended leading end 56 of the bag blank 70.

The tucking cylinder station 136 is now encountered by the bag blank 70 which has its leading end 56 advantageously tucked along the score lines 75 and 74 in a manner to be described in detail shortly. Under the circumstances, a tucking cylinder 472 is driven in synchronization with the rotation of the drum 132 such that a spaced pair of tucking blades 474 and 476 are adapted to engage the leading end 56 of the bag blank 70 along its respective score lines 75 and 74. Adjacent sectors of these score lines 75 and 74 of the leading end 56 are accordingly tucked into conveniently disposed opened jaws where they are subsequently pinched or gripped to secure the bag blank 70 against undesirable movement.

Thus, the drum 120 will include a pair of tucking jaw assemblies 480 and 482. The leading tucking jaw 480 includes a stationary jaw 484 and a movable jaw 486, the latter of which is secured to a pivotal shaft 488 suitably journaled in the frame 428 of the drum 432. The moveable jaw 486 is properly biased to a normally closed position against the stationary jaw 484 by means of a pair of springs 490 and 492 extending from properly mounted studs on both the shaft 488 and drum frame 428. The shaft 488 additionally supports a cam follower 494 which serves to open the jaw 486 upon engagement with cam 496 against the bias of the springs 490 and 492 as the tucking blade 474 is encountered. Accordingly, the leading end 56 of the bag blank 70 will have sectors thereof adjacent the score line 75 tucked between the jaws 484 and 486, and securely gripped thereby when the cam follower 494 passes by the cam 496. As will be appreciated shortly, the jaws 484 and 486 are opened once again following the complete formation of the bag bottom and passage through the pressure applying assembly 144 by the conveniently located cam 498, it being understood that the grip provided by these jaws cooperates in forming the bag blank 70 to be driven along with the drum 132.

Turning now to the trailing jaw assembly 484, it will be noted that a similar arrangement is provided, including the stationary jaw 500 and movable jaw 502, which conveniently engage the leading end 56 of the bag blank 70 along the score line 74. The movable jaw 502 is fixed to a pivotal shaft 504 and biased to a normally closed position by means of a pair of springs 506 and 508 anchored to both the shaft 504 and the drum frame 428. The shaft additionally includes a cam follower 510 which serves to open the jaw 502 against the bias provided by the springs 506 and 508 when actuated by cam 512. As will be appreciated, this cam 512 will open the jaws 500 and 502 to permit entry of the tucking blade 476 and consequently the adjacent sectors of the bag blank 70 along the score line 74. Shortly thereafter, the jaw 502 will be released and consequently returned to its normally closed position to securely grip the bag blank along the score line 74. However, as will become evident shortly, the trailing flap 80 is folded along its score line 74 and upon the panel portions 82 and 84 at the trailing flap folding station 184. As the trailing flap 80 is closed, jaws 500 and 502 open and remain open until the finished bag is removed from the drum 152 by the actuation of the cam follower 510 by cam 514.

The flattened and tucked bag blank 70 is now carried to the bottom paste pot station 138 from the tucking station 136 by the drum 132. Here the preselected pattern of paste 86 is applied to the flap 78 and panel portions 82 and 84, as previously mentioned. The bottom paste pot station 138 will include the usual paste or adhesive pot or receptacle 520. A paste pick-up wheel 522 is interiorly mounted in the receptacle 520 and partly immersed in the contained paste. Under such circumstances, continual rotation of the paste pick-up wheel 522 will assure a coating of the selected paste on its circumferentially extending periphery. As will be observed, this periphery is partly exposed through the exterior of the pot 520; whereas a scraper 524 is advantageously located within the pot 520 for assuring even distribution of the paste on the pick-up wheel 522.

An applicator wheel 526 is also constantly driven and includes a raised surface 528 which is adapted to contact the periphery of pick-up wheel 522 in applying the selected pattern of paste 86. In this connection, the rotation of the applicator wheel 526 is synchronized with the rotation of the drum 132 in such a manner that the raised surface 528 will be capable of applying the pattern of paste 86 at the desired location on the bag blank 70 following a properly timed encounter with the paste pick-up wheel 522.

While the paste is still wet and prior to setting, the bag blank 70 is subsequently exposed to the trailing flap folding station 140 at which the trailing flap 80 is folded forwardly along the score line 74 into engagement with sectors of the paste pattern 86. This station includes a pair of flail assemblies 536 and 538; and since both assemblies complement one another, both structurally and functionally, only one will be described in detail. Thus, referring to the flail assembly 536, it will be observed that a flail 540 extends transversely from shaft 542 rotatably mounted by a suitably supported stationary bushing 544. The upper end of the shaft 542 has a miter gear 546 affixed thereto which meshes with a miter gear 548 driven in synchronization with the drum 132. Under the circumstances, the drive imparted to the flail 540 should be sufficiently rapid for the flail to engage the flap 80 from behind as the bag blank is carried by the drum 132 and force the encountered flap forwardly about the score line 74 into engagement with the paste pattern 86 present on the panel portions 82 and 84. At such time, it will be recalled that the jaws 500 and 502 of the trailing tucking jaw assembly 482 will open to release the gripped sectors of the bag blank 70 along the score line 74.

Figure 27A:
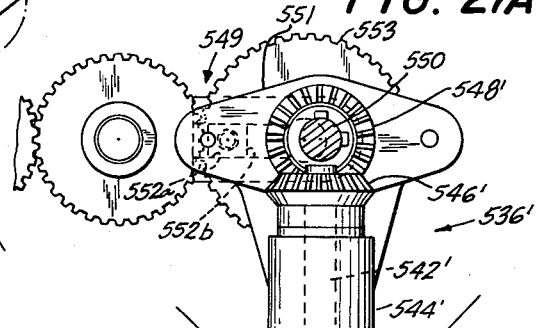
FIG. 27A and 28A are respectively similar elevational and plan views of another embodiment of the bag bottom folding assembly.
Figure 27:
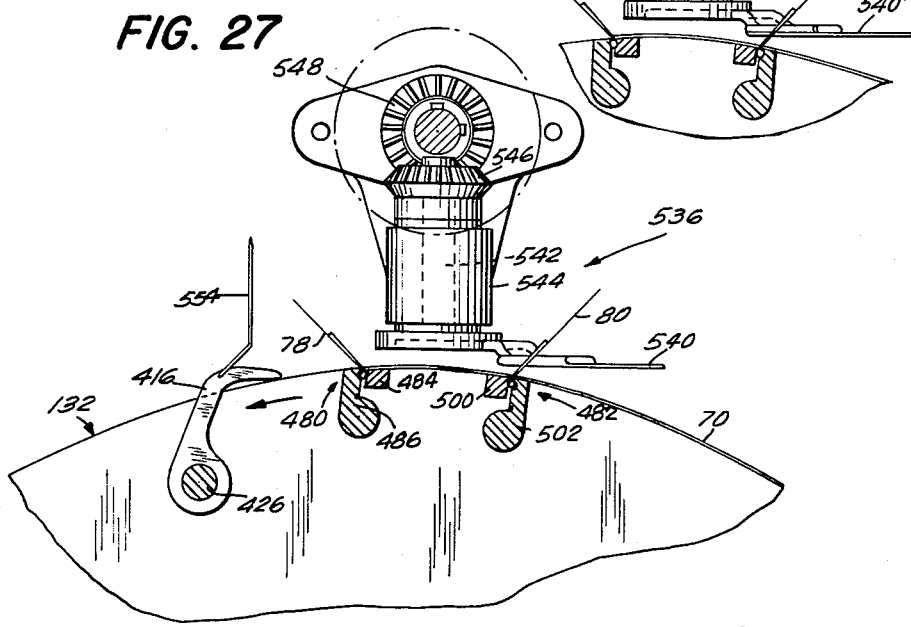
FIG. 27 is a fragmentary elevational view of the bag bottom flap folding assembly, with certain parts broken away and removed, while others are shown in section.
Figures 28, 28A:
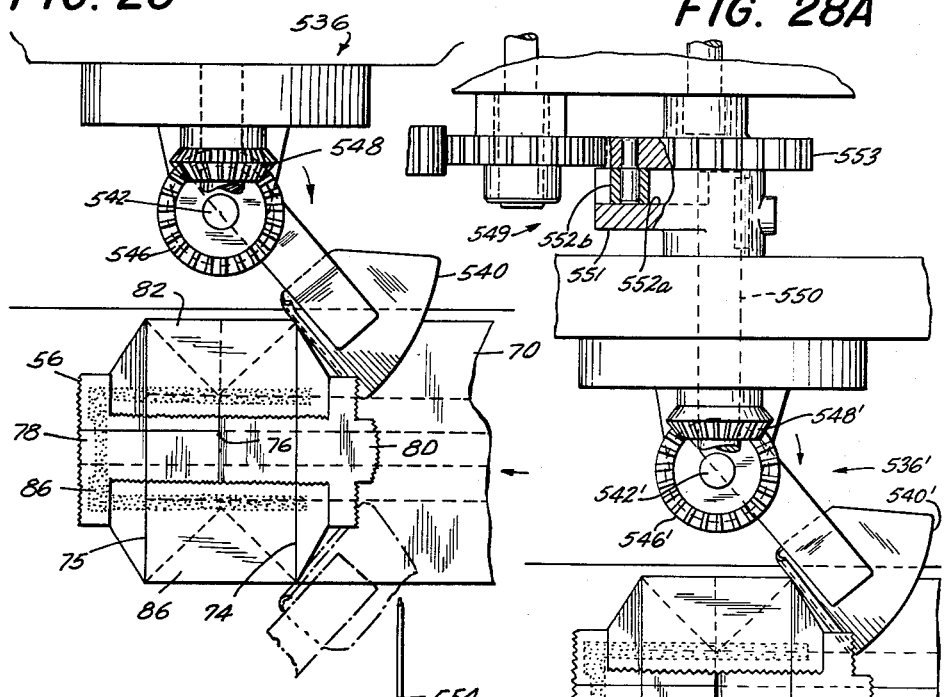
FIG. 28 is a top plan view of the folding assembly of FIG. 27.
Figure 29:
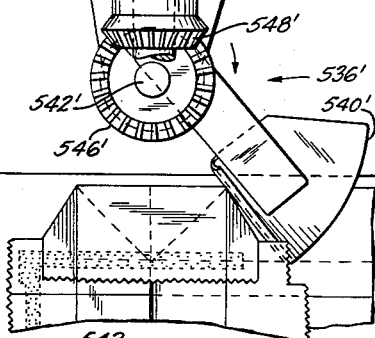
FIG. 29 is a view similar to that illustrated in FIG. 27 with the folding assembly illustrated immediately prior to the completion of the folding operation.
Figure 30:
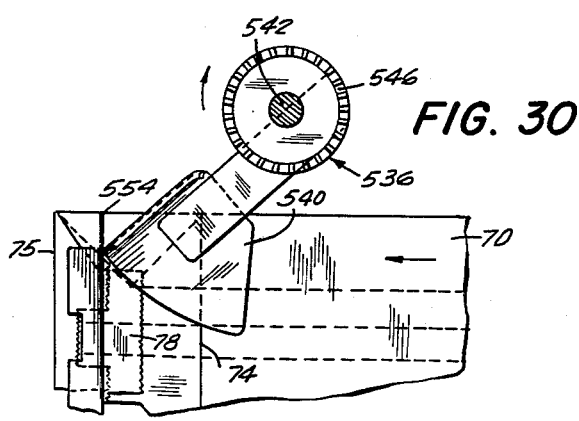
FIG. 30 is a top plan similar to that shown in FIG. 28 of the arrangement of parts of the folding assembly illustrated in FIG. 29.
Figure 31:
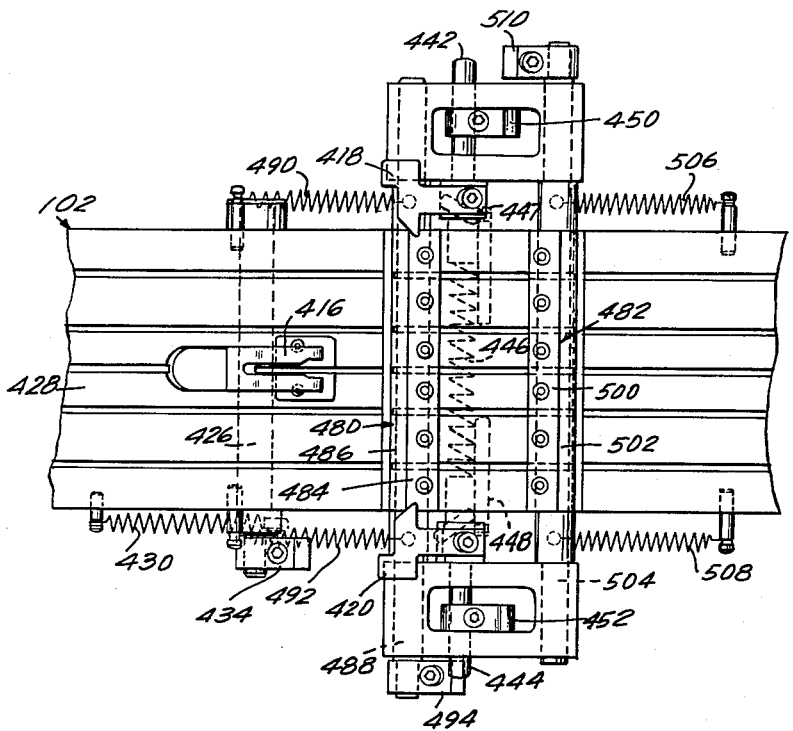
FIG. 31 is a fragmentary view on an enlarged scale of one of the six stations of the bag bottom forming drum.
Figure 32:
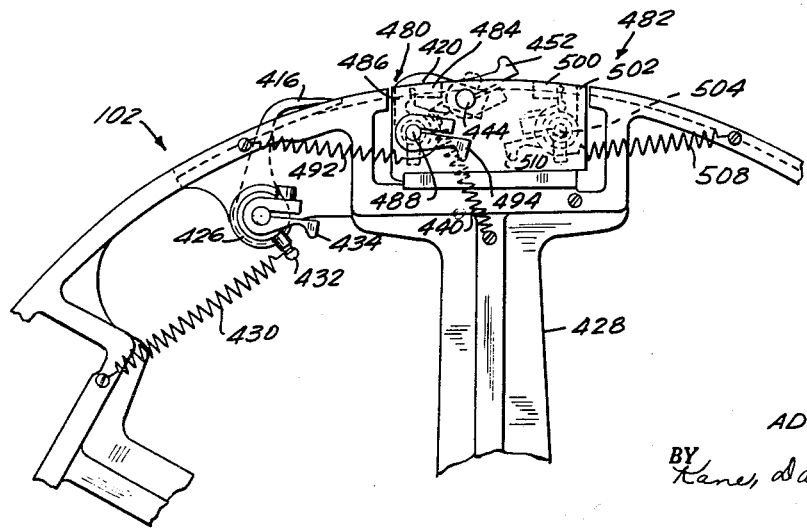
FIG. 32 is a slide elevational view, with certain parts sectioned, of this station of the drum.

The present invention also contemplates the employment of pulsating flail assemblies at the trailing flap folding station of the type exemplified in FIGS. 27A and 28A. In this connection, it may be found desirable, in order to prevent rupture or improper flap folding upon initial contact or engagement of the flails with the trailing flap 80, to reduce impact by reducing the rate of flail travel at trailing flap contact. For purposes of then performing the proper folding operation within the permissible time period governed by drum rotation, the speed at which the flails travel is increased.

Thus, a crank mechanism 549 is incorporated into the drives for the individual flail assemblies which, together with their respective components, will in this embodiment be identified with like numerals having accompanying primes. The shaft 550 bearing gear 548' has keyed thereto a laterally projecting arm 551 having a radial slot 552a. A crank 552b rides in this slot and projects from a gear 553 forming part of the drive gear train. The rotational axis of this gear 553 is eccentric with respect to shaft 550 as shown. Under these circumstances, upon rotation of gear 553, the crank 552b will engage the walls of the slot 552a and drive the shaft 550 with a variable crank arm. The flail 540' will rotate in a corresponding manner; and, accordingly, the flail will engage the trailing flap 80 when traveling at a slower speed which immediately builds-up and increases to timely effect the desired folding operation.

Shortly after the leading end 56 of the bag blank 70 is suitably tucked at the tucking station 136, the drum center finger 416 will release its grip upon the leading flap 78 after pasting due to the eventual engagement of the cam 462 by the cam follower 434. Accordingly, when the leading flap folding station 142 is sequentially presented to the carried bag blank 70, the leading flap 78 is somewhat upstanding with respect to the normal tangential line at such location due to the tuck disposed between the forward tucking jaw assembly 480 thereby facilitating the folding of this flap rearwardly upon the score line 75 as it encounters the stationary plate 554 of this station 142. This plate 554 is somewhat oblique at its lower end, substantially as shown, for purposes of most effectively exerting the desired pressure on the forward face of the leading flap 78 as it is moved in an arcuate path on the periphery of the drum 132. It should be understood that the flail 540 manages to accomplish the desired folding of the trailing flap 80 at such time as the leading flap 78 is in the process of being bent backwardly along the score line 75 by the plate 554. As discussed in the above, the adjacent sectors of the score line 75 are still tucked within the jaws 484 and 486 of the leading tucking jaw assembly 480. Thus, as the free end of the flap 78 passes by the bottom terminal end of the stationary plate 554, the remaining portions of the paste pattern 86 will effectively and sufficiently tack the inner surfaces of the leading flap 78 to the associated surfaces of the panel portions 82 and 84 and outer face of the trailing flap 80.

The flaps 78 and 80 are now subjected to the pressure applying station 144 which is essentially a belt 560 disposed over a drive pulley 562, driven pulley 564 and idler pulley 566. As illustrated, a section of the belt 560 neatly corresponds to the outer circumferentially extending contour of the drum 132 such that an interposed bag blank 70 will be pressurized therebetween. Thus flaps 78 and 80 are securely adhered to the associated surfaces of the now finished bag.

The finished bag blanks 70 are still carried along the periphery of the drum 132 as a result of the closure of the jaws 484 and 486 of the tucking assembly 480. However, as the drum 132 approaches the stacking station 146, the follower 494 encounters the cam 498 at which time the tucking jaw assembly 480 opens to release the finished bag, which is ultimately dispensed and stacked in accordance with the predetermined arrangement at the stacking station 146. As mentioned in the above, one of the finished bags is elevated at preselected intervals for determining a particular count of the number of finished bags stacked at station 146. A predetermined number of finished bags may then be removed from the station 146. Since the stacking station 146 is well known to the art and may assume one of a number of commercially available structural forms, it will not be described in detail at this time.

Figure 12:
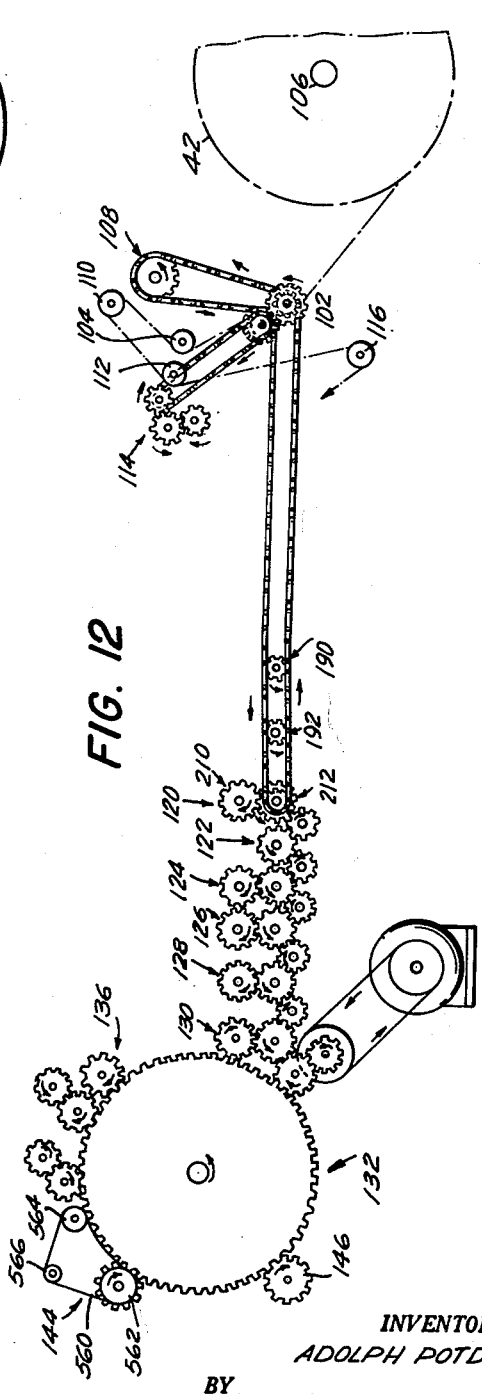
FIG. 12 is a similar schematic view illustrating the drive for the components constituting the individual stations and states.
Figure 13:
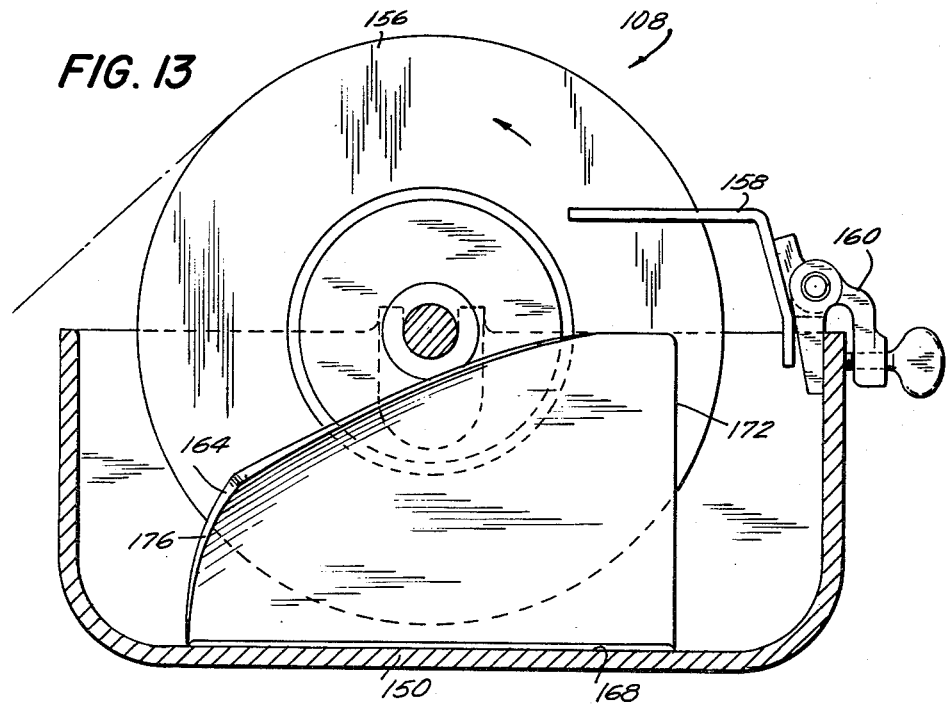
FIG. 13 is an enlarged elevational view, with certain parts broken away and removed, of the seam paste pot assembly for applying adhesive in the seam formation present in the well known paper bag.
Figure 14:
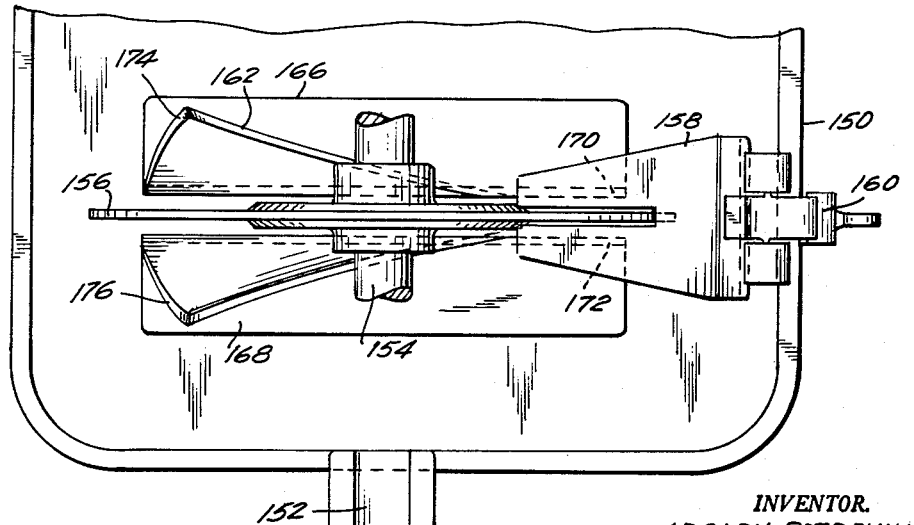
FIG. 14 is a top plan view, with certain parts broken away and removed, of the seam paste pot assembly illustrated in FIG. 13.
Figure 20:
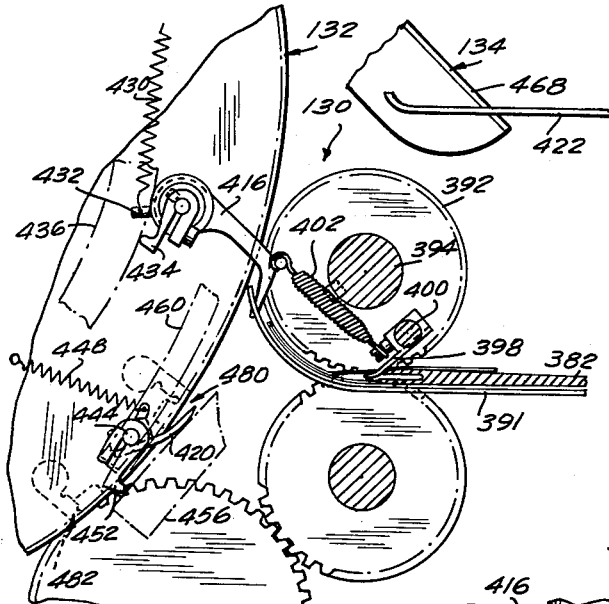
FIG. 20 is an enlarged elevation view of the bottom opening and tuck spreader assembly and shows the arrangement of parts approximately at such time as the truck spreading is initiated and the upper part of the tuck grasped by the finger on the opening cylinder.
Figure 21:
FIG. 21 is a plan view of this assembly.

In FIG. 12 a representative drive is illustrated for the previously described stations of the bag formation process of the bag making machine 100. Since it is believed that those skilled in the art can readily associate the illustrated drive with the stations, the drive will not be described in detail at this time. Suffice it to say that the stations are generally designated in this figure, and the direction of rotation of the gears as induced by the motor drive is denoted by properly applied arrows.

Figure 24:
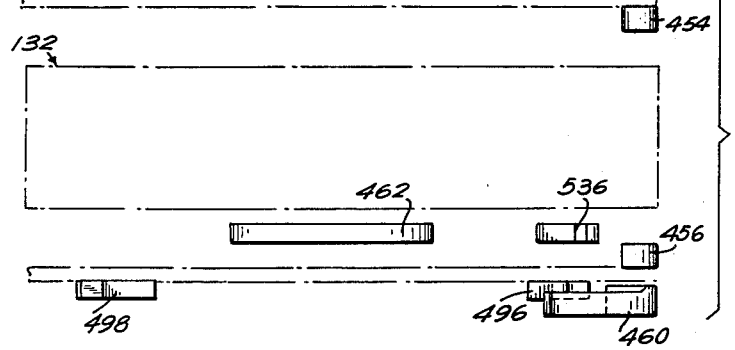
FIG. 24 is a diagrammatic plan view of the disposition and layout of the various cams in relation to the drum whereby they may most effectively cooperate in carrying out the functioning of the several stations on the drum.
Figure 25:
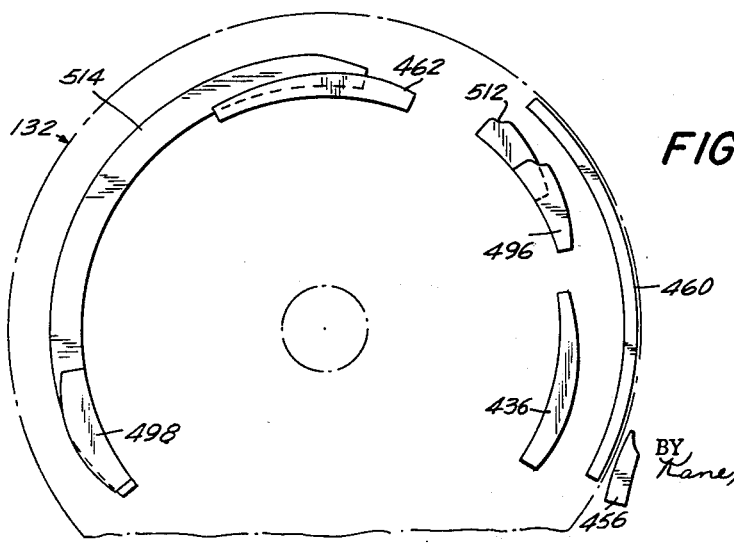
FIG. 25 is an elevational view of the parts represented in FIG. 12.
Figure 26:
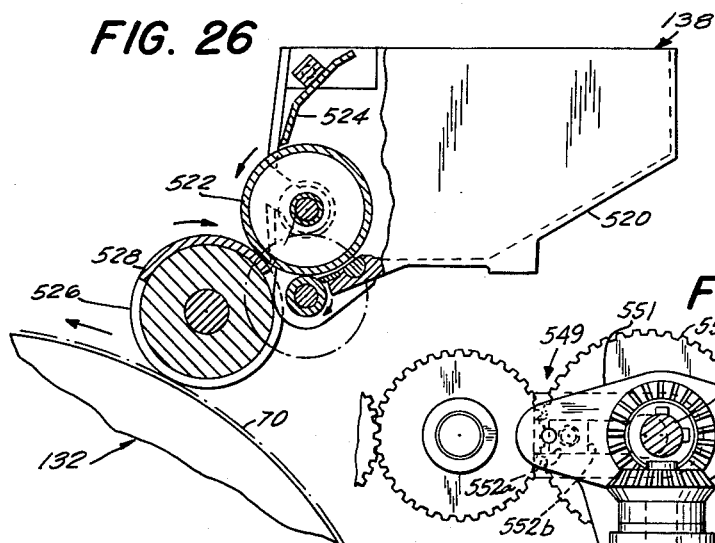
FIG. 26 is a fragmentary elevational view, partly in section, of the bag bottom paste pot assembly and applicator mechanism.

The diameter of the drum 132 is properly selected in accordance with calculations based on an operation that considers progressively acting upon several successive blanks 70 at substantially the same time as is common in continuous bag making machines. Under the circumstances, the drum 132 is preferably provided with a plurality of stations at which the previously described drum fingers 416, 418 and 420 are located together with the pair of jaw tucking assemblies 480 and 482 bearing substantially identical structure to that previously described. In the present instances, there are fixed stations which are timely actuated by the same sets of cams bearing a predetermined relation to each other and to the drum 132 as described and depicted in the various figures, particularly FIGS. 24 and 25. In this connection, a specific embodiment of the disclosed apparatus 100 produced approximately 600 finished bags per minute and it was so constructed and arranged with proper settings, that 600 tubular bag blanks 70 were cut at the cut-off station 124 and a drum 132 with six of the above-mentioned stations thereon rotated at approximately 100 r.p.m. for purposes of exposing the leading end 56 of the bag blank 70 to the described bag bottom forming stations.

Thus, the aforenoted objects and advantages are most effectively attained. It should be understood, however, that my invention is in no sense limited by the preferred embodiment illustrated and described herein, but its scope is to be taken and determined by that of the appended claims.

I claim:

1. A bag-making machine comprising in combination: supply means for supplying a length of sheet material; web feeding means for feeding a web of said sheet material; guide means for guiding said web of sheet material as it is being fed; adhesive applying means for applying adhesive along a longitudinal edge of said web as it is being guided; forming means for forming said web into a substantially collapsed tube as it is being fed, said tube having an adhesively secured seam defined by overlapped longitudinally extending edges with the adhesive interposed therebetween, said tube having a top and bottom layer, and said tube further having a pair of opposed longitudinally extending sides arranged in a bellows fold; a slitting means for cutting a forwardly extending projecting tongue in the upper layer of the leading end of said web and spaced longitudinal slits in both layers of the end of said web with said tongue interposed therebetween, said means being operable periodically to cut said web so that the cut tongue in the leading end will form a notch in the upper layer of the trailing end, which trailing end will eventually be the top of the finished bag, said notch serving to facilitate the gripping of the finished bag with the thumb when it is fully collapsed; means for forming a bag blank of predetermined length including cutting means for cutting said web in predetermined length blanks transversely from the base of said tongue to form a tubular bag blank and separating elements so constructed and arranged to maintain the complete separation of the longitudinally extending bellows folded sides and maintain constant separation of the bellows fold in said bag blank of predetermined length immediately prior to the formation of the bag bottom on said bag blank, said separating elements including a plurality of rotatably driven discs, at least one of said discs including a cut-out sector at its periphery, and said cutting means including a blade driven in synchronization with said disc and so constructed and arranged with respect thereto as to be adapted to project through the peripheral cut-out sector of said disc to thereby perform work on said sheet material; blank feeding means for feeding the blanks as they are formed; scoring means for forming a pair of spaced transverse score lines in both layers of said blank, both of said score lines being spaced from and proximal the leading end of said blank for cooperating in determining the bag bottom; bag bottom opening means for distending the leading end of said bag blank such that this end is fully unfolded transversely; bag bottom flattening means for folding the upper layer of the bag blank on itself from the score line nearest the trailing end to the leading end of the bag blank; tucking means for tucking the bag blank along the score line of the bottom layer nearest said leading end of the bag blank and also the bag blank along the score line of said upper layer nearest said leading end; bag bottom paste applying means for applying paste along zones of the inner face of the bottom layer between the slits formed therein and the outer face of the blank between the aligned slits in the top and bottom layers thereof;

upper laper flap folding means for folding the upper layer upon itself along its score line nearest said leading end; bottom layer flap folding means for folding the lower layer upon itself along its score line nearest said leading end; pressure means for applying pressure to the leading end of said bag blank to secure associated surfaces of said blank having paste interposed therebetween to thus form a finished bag; and stacking means for stacking bags as they are finished by said machine.

2. A bag-making machine comprising in combination: bag blank forming means for forming a tubular bag blank of predetermined length having a top and bottom layer connected by opposed longitudinally extending bellows folds along their longitudinal side edges and having a pair of spaced slits in both layers in an aligned relationship; blank feeding means for feeding the blanks as they are formed; scoring means for forming a pair of spaced transverse score lines in both layers of said blank, both of said score lines being spaced from and proximal the leading end of said blank for cooperating in determining the bag bottom; bag bottom opening means for distending the leading end of said bag blank such that this end is fully unfolded transversely; bag bottom flattening means for folding the upper layer of the bag blank on itself from the score line nearest the trailing end to the leading end of the bag blank; tucking means for tucking the bag blank along the score line of the bottom layer nearest said leading end of the bag blank, and also the bag blank along the score line of said upper layer nearest said leading end; bag bottom paste applying means for applying paste along zones of the inner face of the bottom layer between the slits formed therein and the outer face of the blank between the aligned slits in the top and bottom layers thereof; upper layer flap folding means for folding the upper layer upon itself along its score line nearest said leading end and including at least one flail, actuating means for rotating said flail in a timed relationship with respect to the movement of the bag blank such that when rotated, the flail is adapted to engage the outer face of the upper layer to fold the upper layer upon itself, said flail including an elongated edge for engaging the outer face of the upper layer and said actuating means operating to cause the flail engaging edge portion of shorter radius engaging the outer face of the upper layer initially to keep the forces of impact engagement at a relatively low value with the remaining portions of the engaging edge of the flail subsequently engaging the outer face of the upper layer to complete the folding of the upper layer upon itself; bottom layer flap folding means for folding the lower layer upon itself along its score line nearest said leading end; pressure means for applying pressure to the leading end of said bag blank to secure associated surfaces of said blank having paste interposed therebetween to thus form a finished bag; and stacking means for stacking bags as they are finished by said machine.

3. A bag-making machine comprising in combination: horizontally disposed bag blank forming means for forming a tubular bag blank of predetermined length having a top and bottom layer connected by opposed longitudinally extending bellows folds along their longitudinal side edges and having a pair of spaced slits in both layers in an aligned relationship and said bag blank forming means including at least one slotted member and a cutter movable in timed relationship with one another, said slotted member being so constructed and arranged to maintain constant separation of the bellows fold in said bag blank and said cutter being projectable through the slot of the member for severing the bag blank of predetermined length; blank feeding means for feeding the blanks as they are formed; scoring means for forming a pair of spaced transverse score lines in both layers of said blank, both of said score lines being spaced from and proximal the leading end of said blank for cooperating in determining the bag bottom; bag bottom opening means for distending the leading end of said bag blank such that this end is fully unfolded transversely, said bag bottom opening means includes means for cooperating to maintain the top and bottom layers spaced from one another with the bellows folds in an expanded condition and rotatable roll having an axis, finger means mounted by said roll for grasping the upper layer at both of its sides within the bellows fold adjacent the score line nearest the leading end, gripping means for gripping the bottom layer between its spaced slits at said leading end, and first control means including a cam mechanism for actuating said finger means in a preselected sequence inwardly and outwardly with respect to the bellows fold of the bag blank in timed relationship, said first control means further including a spring biasing means for biasing said finger means and another cam mechanism for elevating said finger means against the bias of said spring biasing means with respect to the axis of rotation of the roll on which it is mounted and further control means for actuating said gripping means in a timed relationship with respect to the operation of said finger means; and bag bottom forming means including a drum mounting the gripping means and further control means for forming a bag bottom on said bag blank to thereby provide a finished bag.

4. A bag-making machine comprising in combination: bag blank forming means for forming a tubular bag blank of predetermined length having a top and bottom layer connected by opposed longitudinally extending bellows folds along their longitudinal side edges and having a pair of spaced slits in both layers in an aligned relationship; blank feeding means for feeding the blanks as they are formed; scoring means for forming a pair of spaced transverse score lines in both layers of said blank, both of said score lines being spaced from and proximal the leading end of said blank for cooperating in determining the bag bottom; bag bottom opening means for distending the leading end of said bag blank such that this end is fully unfolded transversely; bag bottom flattening means for folding the upper layer of the bag blank on itself from the score line nearest the trailing end to the leading end of the bag blank; tucking means for tucking the bag blank along the score line of the bottom layer nearest said leading end; bag bottom paste applying means for applying paste along zones of the inner face of the bottom layer between the aligned slits in the top and bottom layers thereof; upper layer flap folding means for folding the upper layer upon itself along its score line nearest said leading end,, said upper layer folding means includes a pair of flails in spaced relationship, actuating means for rotating said flails in a timed relationship with respect to the movement of the bag blank such that when rotated, the flails are adapted to engage the outer face of the upper layer between the score line nearest the leading end and thusly fold the leading end of the upper layer from the score line nearest the leading end along this score line so that surfaces of the upper layer engage with the applied paste, each of the flails including an elongated engaging edge for engaging the outer face of the upper layer and the actuating means operating to cause the engaging edge sectors of the flail having a shorter radius to engage the outer face of the upper layer first to minimize the forces of impact and engagement and then cause the remaining portions of the engaging edge of the flail to come into engagement with the upper layer to complete the folding of the upper layer upon itself; and means for completing the formation of the bag bottom on said bag blank to thereby provide a finished bag.

5. The invention in accordance with claim 4, wherein said tucking means operates to project the upper layer from the score line nearest the leading end at an angle with respect to the plane of the bag blank so that said flails are adapted to engage the outer exposed face of the upper layer.

6. A bag-making machine comprising in combination: bag blank forming means for forming a tubular bag blank of predetermined length having a top and bottom layer connected by opposed longitudinally extending bellows folds along their longitudinal side edges and having a pair of spaced slits in both layers in an aligned relationship and said bag blank forming means including at least one slotted member and a cutter movable in timed relationship with one another, said slotted member being so constructed and arranged to maintain constant separation of the bellows fold in said bag blank and said cutter being projectable through the slot of the member for severing the bag blank of predetermined length; blank feeding means for feeding the blanks as they are formed; scoring means for forming a pair of spaced transverse score lines in both layers of said blank, both of said score lines being spaced from and proximal the leading end of said blank for cooperating in determining the bag bottom; bag bottom opening means for distending the leading end of said bag blank such that this end is fully unfolded transversely; bag bottom flattening means for folding the upper layer of the bag blank on itself from the score line nearest the trailing end to the leading end of the bag blank; tucking means for tucking the bag blank along the score line of the bottom layer nearest said leading end of the bag blank and also the bag blank along the score line of said upper layer nearest said leading end; bag bottom paste applying means for applying paste along zones of the inner face of the bottom layer between the slits formed therein and the outer face of the blank between the aligned slits in the top and bottom layers thereof; upper layer flap folding means for folding the upper layer upon itself along its score line nearest said leading end and including at least one rotatable flail including an elongated engaging edge adapted to engage the upper layer along predetermined sectors to minimize impact and the forces of engagement in folding the upper layer upon itself without rupturing the upper layer; bottom layer flap folding means for holding the lower layer upon itself along its score line nearest said leading end; pressure means for applying pressure to the leading end of said bag blank to secure associated surfaces of said blank having paste interposed therebetween to thus form a finished bag,, said pressure means includes a pressure belt revolvable in a timed relationship with respect to the displacement of the bag blank.

7. A relatively high speed bag-making machine comprising in combination: supply means for supplying a length of sheet material; web feeding means for feeding a web of said sheet material; guide means for guiding said web of sheet material as it is being fed; adhesive applying means for applying adhesive along a longitudinal edge of said web as it is being guided, said adhesive applying means includes a receptacle for holding the adhesive to be applied, a rotatable wheel disposed partly within said receptacle such that its circumferentially extending periphery is adapted to be immersed in the contained adhesive whereby said outer periphery picks up said adhesive and transfers it to the web which is engaged with the periphery of said wheel above the adhesive level in said receptacle, means for preventing splattering of said adhesive as said wheel rotates at high speeds, and means for assuring that the periphery of said wheel contacts said adhesive in the receptacle when said wheel rotates at relatively high speeds; forming means disposed in a substantially horizontal plane for forming said web into a substantially collapsed tube as it is being fed, having an adhesively secured seam defined by overlapped longitudinally extending edges with the adhesive interposed therebetween, having a top and bottom layer and having a pair of opposed longitudinally extending sides arranged in a bellows fold; means for forming a bag blank of predetermined length from said tube; and further drum means for receiving a bag blank from the horizontally disposed forming means and forming a bag bottom on said bag blank to thereby provide a finished bag.

8. The invention in accordance with claim 7, wherein the assuring means includes a pair of baffle plates disposed within the receptacle with said wheel interposed therebetween, such that when said wheel rotates at substantially high speeds, the adhesive will be prevented from being displaced away from the outer periphery and be forced to be confined within said plates such that the adhesive will come in contact with the revolving outer periphery of said wheel.

9. A bag making machine comprising in combination: supply means for suplying a length of sheet material; web feeding means for feeding a web of said sheet material; guide means for guiding said web of sheet material as it is being fed; adhesive applying means for applying adhesive along a longitudinal edge of said web as it is being guided; forming means for forming said web into a substantially collapsed tube as it is being fed, having an adhesively secured seam defined by overlapped longitudinally extending edges with the adhesive interposed therebetween, having a top and bottom layer and having a pair of opposed longitudinally extending sides arranged in a bellows fold; means for forming a bag blank of predetermined length from said tube including separating elements so constructed and arranged to maintain the complete separation of the longitudinally extending bellows folded sides, the separating elements being so constructed and arranged to maintain constant separation of the bellows fold in said bag blank of predetermined length immediately prior to the formation of the bag bottom on the bag blank, the separating elements including a plurality of rotatably driven discs, at least one of said discs including a cut-out sector at its periphery, and said means for forming a bag blank including a blade driven in synchronization with said disc and being so constructed and arranged with respect thereto as to be adapted to project through the peripheral cut-out sector of said disc to thereby perform work on said sheet material; and further means for forming a bag bottom on said bag blank to therby provide a finished bag.

10. A bag making machine comprising in combination: supply means for supplying a length of sheet material; web feeding means for feeding a web of said sheet material along a substantially horizontal path; guide means for guiding said web of sheet material as it is being fed; adhesive applying means for applying adhesive along a longitudinal edge of said web as it is being guided; forming means for forming said web into a substantially collapsed tube as it is being fed, having an adhesively secured seam defined by overlapped longitudinally extending edges with the adhesive interposed therebetween, having a top and bottom layer and having a pair of opopsed longitudinally extending sides arranged in a bellows fold; means for forming a bag blank of predetermined length from said tube, and said bag blank forming means including at least one slotted member and a cutter movable in timed relationship with one another, said slotted member being so constructed and arranged to maintain constant separation of the bellows fold in said bag blank and said cutter being projectable through the slot of the member for severing the bag blank of predetermined length; and further means for forming a bag bottom on said bag blank to thereby provide a finished bag, said further means including a bag bottom opening means for distending the leading end of said bag blank such that this end is fully unfolded transversely, said bag bottom opening means includes means for cooperating to maintain the top and bottom layers spaced from one another with the bellows folds in an expanded condition, a rotatable roll, finger means on the roll for grasping the upper layer at both of its sides within the bellows fold, a bag bottom forming drum, gripping means on the drum for gripping the bottom layer, first control means for actuating said finger means in a preselected sequence and including a cam mechanism for actuating said finger means inwardly and outwardly with respect to the bellows fold of the bag blank in timed relationship, said first control means further including another cam mechanism for elevating said finger means periodically for facilitating the grasping of the upper layer at both of its sides within the bellows fold, and further cam control means for actuating said gripping means in a timed relationship with respect to the operation of said finger means.

11. The invention in accordance with claim 10, wherein said first control means includes a cam mechanism for actuating said finger means inwardly and outwardly with respect to the bellows fold of the bag blank in timed relationship, and said first control means further including another cam mechanism for elevating said finger means periodically for facilitating the grasping of the upper layer at both of its sides within the bellows fold.

12. A bag-making machine comprising in combination: supply means for supplying a length of sheet material; web feeding means for feeding the web of said sheet material; guide means for guiding said web of sheet material as it is being fed; adhesive applying means for applying adhesive along a longitudinal edge of said web as it is being guided; forming means for forming said web into a subtsantially collapsed tube as it is being fed, having an adhesively secured seam defined by overlapped longitudinally extending edges with the adhesive interposed therebetween, having a top and bottom layer and having a pair of opposed longitudinally extending sides arranged in a bellows fold; means for forming a bag blank of predetermined length from said tube; and further means for forming a bag bottom on said bag blank to thereby provide a finished bag, said further means including a top layer folding means for folding the top layer upon itself, said top layer folding means including at least one flail, actuating means for rotating said flail in a timed relationship with respect to the movement of the bag blank such that when rotated, the flail is adapted to engage the outer face of the upper layer to fold the upper layer upon itself said flail having an elongated engaging edge for engaging the outer surface of the upper layer, said actuating means operating to cause the engaging edge to engage the outer face of the upper layer along sectors of the flail having relatively small radii to thereby reduce the forces of impact and engagement of the flail with the upper layer and remaining sectors of the engaging edge of the flail being adapted to thereafter come into engagement with the outer face of the upper layer in completing the folding of the upper layer upon itself.

13. The invention in accordance with claim 12, wherein said further means for forming a bag bottom additionally includes bottom layer folding means for folding the lower layer upon itself, said bottom layer folding means including a stationary plate proximately located with respect to the path of travel of the bag blank and adapted to engage the outer face of the bottom layer as the bag blank is being guided to hold the bottom layer upon itself.

14. The invention in accordance with claim 12 wherein said actuating means includes means for rotating said flail at a predetermined and relatively slow rate of travel when said flail engages the outer face of the upper layer and then increasing the rate of travel of the rotating flail above the predetermined rate to fold the upper layer upon itself.

15. A bag-making machine comprising in combination: supply means for supplying a length of sheet material; web feeding means for feeding the web of said sheet material; guide means for guiding said web of sheet material as it is being fed; adhesive applying means for applying adhesive along a longitudinal edge of said web as it is being guided; forming means for forming said web into a substantially collapsed tube as it is being fed, having an adhesively secured seam defined by overlapped longitudinally extending edges with the adhesive interposed therebetween, having a top and bottom layer and having a pair of opposed longitudinally extending sides arranged in a bellows fold; means for forming a bag blank of predetermined length from said tube; and further means for forming a bag bottom on said bag blank to thereby provide a finished bag, said further means including a top layer folding means for folding the top layer upon itself, said top layer folding means including a pulsating mechanism for engaging the outer face of the upper layer and then folding the upper layer upon itself, the speed of operation of the pulsating mechanism being increased during said folding relative to the engaging of the outer face of the upper layer.

16. A bag-making machine comprising in combination: supply means for supplying a length of sheet material; web feeding means for feeding the web of said sheet material; guide means for guiding said web of sheet material as it is being fed; adhesive applying means for applying adhesive along a longitudinal edge of said web as it is being guided; forming means for forming said web into a substantially collapsed tube as it is being fed, having an adhesively secured seam defined by overlapped longitudinally extending edges with the adhesive interposed therebetwen, having a top and bottom layer and having a pair of opposed longitudinally extending sides arranged in a bellows fold; means for forming a bag blank of predetermined length from said tube; and further means for forming a bag bottom on said bag blank to thereby provide a finished bag, said further means including a top layer folding means for folding the top layer upon itself, said top layer folding means including at least one flail, actuating means for rotating said flail in a timed relationship with respect to the movement of the bag blank such that when rotated, the flail is adapted to engage the outer face of the upper layer to fold the upper layer upon itself, said actuating means including means for rotating said flail at a predetermined and relatively slow rate of travel when said flail engages the outer face of the upper layer and then increasing the rate of travel of the rotating flail above the predetermined rate to fold the upper layer upon itself.

References Cited by the Examiner
UNITED STATES PATENTS

| 807,211 | 12/05 | Smith | 93—24 |
| 1,571,983 | 2/26 | Weber | 93—14 |
| 1,894,726 | 1/33 | Beckman | 93—14 |
| 2,324,358 | 7/43 | Burroughs | 93—14 |
| 2,855,895 | 10/59 | Burns et al. | 118—407 |
| 3,094,044 | 6/63 | Williams et al. | 93—22 |

FRANK E. BAILEY, *Primary Examiner.*